Figure 1:
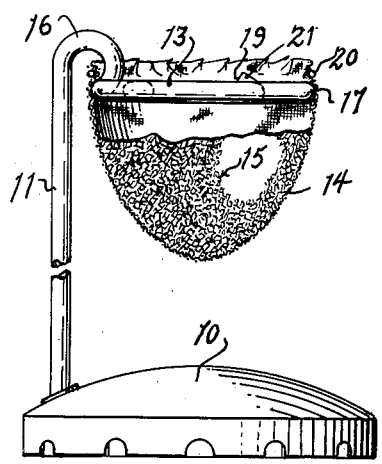

May 14, 1963     L. D. ACKERMAN     3,089,405

COFFEE BREWING ELEMENT

Filed Jan. 26, 1962

INVENTOR.
LIONEL D. ACKERMAN.
BY
*W. H. Atkinson*
ATTORNEY

United States Patent Office 3,089,405
Patented May 14, 1963

3,089,405
COFFEE BREWING ELEMENT
Lionel D. Ackerman, 1161 Granada St., Belmont, Calif.
Filed Jan. 26, 1962, Ser. No. 170,305
2 Claims. (Cl. 99—308)

My present invention relates to coffee brewing and particularly to a device for use in any conventional water boiling utensil for the brewing of coffee.

An object of the invention is to provide a new and novel coffee brewing device which may be employed with any suitable type of water boiling receptacle for brewing ground coffee in a sanitary and convenient manner.

Another object of the invention is to provide a coffee brewing device of novel construction that is both practical and efficient in its operation and which is simple in construction and inexpensive to manufacture.

A further object of the invention is to provide a coffee brewing device having novel boiling water circulating features with which a disposable filter-type coffee carrying sack may be conveniently attached for use and removed therefrom for disposal after use in a simple and sanitary manner.

Other objects and advantages will be in part evident to those skilled in the art and in part pointed out hereinafter in the following description taken in connection with the accompanying drawing wherein there is shown by way of illustration and not of limitation a preferred embodiment of the invention.

Figure 2:
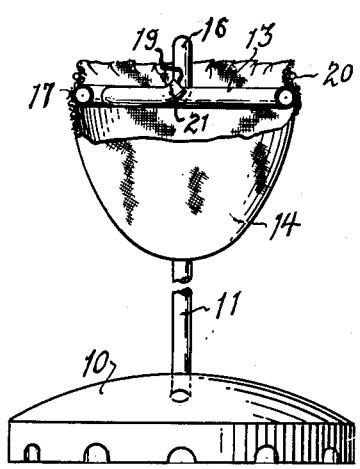
Figure 3:
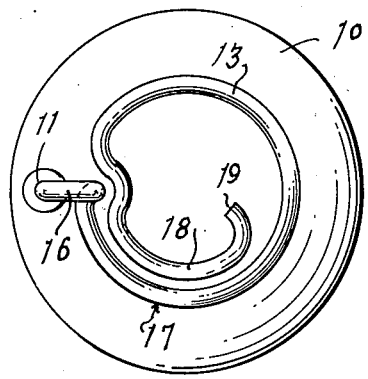
Figure 4:
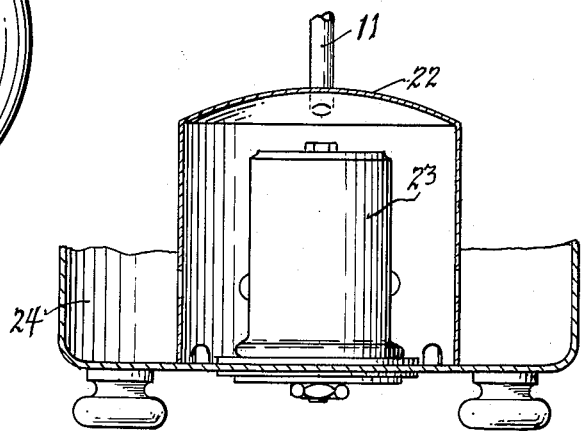

In the drawing wherein like numerals refer to like parts throughout the several views:

FIGURE 1, is a side view partially in sections of a device constructed in accordance with the invention, FIGURE 2, is a front view of the device as shown in FIGURE 1, with parts broken away to reveal other details of construction, FIGURE 3, is a top view of the device as shown in FIGURE 1, with the coffee retaining sack removed, and FIGURE 4, is a fragmentary sectional view showing a modification of the invention for use with an electrically heated coffee brewing receptacle.

Reference is now made to the accompanying drawing wherein there is shown a preferred embodiment of the invention, which consists of three major parts, namely, an open bottom dome-like hot water confining and support forming member 10, a vertical standpipe 11 in communication at its lower end with the interior of said member and which is formed at its upper end as a horizontally disposed circular or ring-like portion 13, and a water pervious sack 14 in which a quantity of ground coffee 15 to be brewed is held. The standpipe 11 is of a height sufficient to support the coffee holding sack 14 partially above the level of water in the pot within which the device is to be used and at its upper end it is shown as looped over and downwardly as at 16 so that the ring-like portion thereof, designated by the numeral 17, will present a substantially continuous circular or annular external surface about which the open end of the coffee carrying sack 14 may be secured. The substantially continuous ring forming portion 17 of the standpipe 11 is better shown in FIGURE 3 as also having an inner concentric and coplanar extension 18 having an open end 19 through which water pumped from the dome-like support 10 in the well understood manner will be directed to the coffee in the sack 14 when the device is in use.

As shown in FIGURES 1 and 2 of the drawing the sack 14 is shown as having an elastic band or shirr string 20 at its upper open end by which it will be secured about the ring forming portion 17 of the standpipe 11. In these figures of the drawing the open end 19 of the standpipe 11 is shown as turned slightly upwardly as at 21 but it will be understood that this open end 19 may be turned downwardly to discharge hot water more directly onto the coffee in the sack 14.

In FIGURE 4 of the drawing, there is shown a form of the invention in which a dome-like member or support 22 is of a depth sufficient to encircle and accommodate an electric heating unit 23 of the type provided in a conventional coffee brewing pot 24.

A feature of the invention is that unlike coffee percolating devices my device may be used in an open pot with or without a cover as the ring-like portion 17 of the standpipe 11 with its inner concentric partial turn 18 will function as a condenser with the result that the percolating water discharged at the open end 19 of the turn 18 will be directed over and/or downwardly onto the coffee in the sack 14 as a substantially continuous flow of hot water and with a minimum of sputtering.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a coffee brewing element of the character described, the combination of a dome-like circular support adapted to be positioned upon the bottom of a water boiling receptacle and under which boiling water will be entrapped, a standpipe carried by and in communciation with the interior of said dome-like support terminating at an off-center point and at its upper end in the form of a substantially continuous horizontally disposed ring portion centrally above said dome-like support and of a diameter corresponding to the open top of a ground coffee accommodating sack, said ring having an inwardly disposed coplanar circular extension with a water discharging open end located substantially centrally thereof, and a disposable water pervious filter sack for ground coffee secured upon the ring portion of said standpipe by tying its open end over the ring portion of said standpipe.

2. In a coffee brewing element, of the character described, the combination of an open bottom dome-like member adapted and arranged to be positioned in a water boiling receptacle under which boiling water will be entrapped, a continuous length of pipe having an upstanding portion carried by and in communication with the interior of said dome-like member at its lower end and coiled at its upper end to form a substantially continuous horizontally disposed sack supporting ring portion for a coffee holding sack, the horizontally disposed ring portion of said length of pipe terminating with an inner concentric and coplanar extension having an open end for the discharge of water substantially centrally of said sack supporting ring, and a water pervious filter-like sack for ground coffee to be brewed secured at its open end around the horizontally disposed ring portion of said length of pipe by a sack shirring means.

References Cited in the file of this patent
UNITED STATES PATENTS
578,769    Pierce _____ Mar. 16, 1897